Patented Feb. 12, 1924.

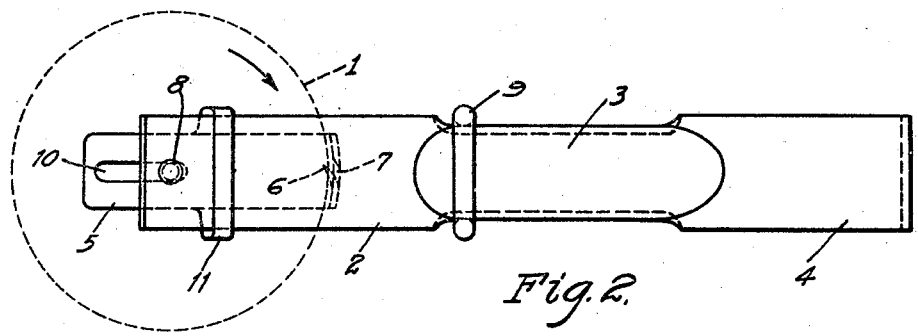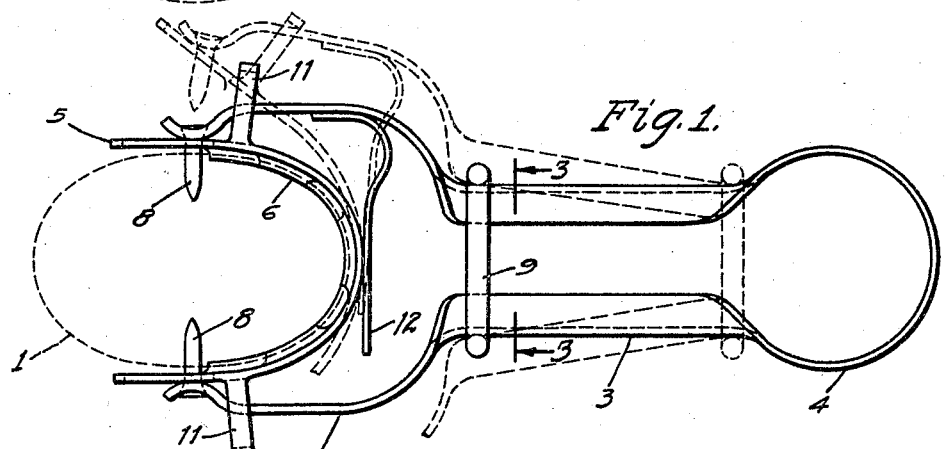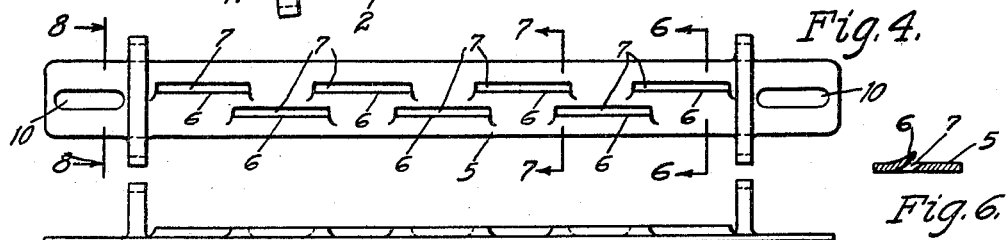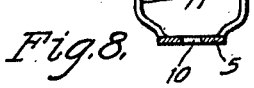

1,483,676

UNITED STATES PATENT OFFICE.

FREDERICK C. PETERSEN, OF LOS ANGELES, CALIFORNIA.

FRUIT PARER.

Application filed August 13, 1923. Serial No. 657,234.

*To all whom it may concern:*

Be it known that I, FREDERICK C. PETERSEN, a subject of the Kingdom of Denmark, residing at Los Angeles, in the county of Los Angeles and State of California, have invented certain new and useful Improvements in Fruit Parers, of which the following is a specification.

My invention relates to fruit parers, and the objects are first to provide a hand tool that will pare fruit with as little labor as possible, and second to construct a fruit parer that is simple in construction and easy to operate.

I attain these objects by the construction illustrated in the accompanying drawings, in which:

Figure 1 represents a side view of the fruit parer with a fruit in position.

Figure 2 represents a top view of Figure 1.

Figure 3 represents a sectional view on line 3—3 of Figure 1.

Figure 4 represents a developed plan view of the cutter knives.

Figure 5 represents a side view of Figure 4.

Figure 6 represents a sectional view on line 6—6 of Figure 4.

Figure 7 represents a sectional view on line 7—7 of Figure 4.

Figure 8 represents a sectional view on line 8—8 of Figure 4.

Referring to the drawings in which like characters of reference designate similar parts, my fruit parer comprises a forceps 2 which is made integral with the handles 3, and the said handles are in turn formed integral with the shank 4, the said forceps 2 are formed so as to reach over the fruit 1 to be pared, the handle is formed to fit the center of an operator's closed hand, and the shank 4 is in turn formed to supply a spring coil to hold the said forceps 2 and handles 3 in an open position. The band 5 is made of a flexible material, and the blades 6 are formed longitudinally on the inner side of the said band 5 in single or multiple lines facing the fruit 1, as shown in Figure 4, and the slots 7 pass through the band 5 in line with the blades 6 as shown in Figures 6 and 7. The spring 12 is secured to the forceps 2 and bears outwardly against the said band 5, and the centers 8 are secured to the two outer end portions of the said forceps 2 and point toward one another and pass operatively through the slots 10 in the band 5, the slots 10 being cut longitudinally in the two end portions of the band 5, and the guides 11 are secured to the outer portions of the band 5 adjacent to the said centers 8 and pass operatively around the outer edges and top faces of the said forceps 2.

When it is desired to pare the fruit 1 the ring 9 is first drawn back to the shank 4, to allow the spring action within the said shank 4 to open the handles 3 and the forceps 2, and the fruit 1 is then placed between the centers 8 so as to swing the said fruit on the said centers 8, between the band 5, and the said ring 9 is then pushed forward over the handles 3 towards the forceps 2 until the said centers 8 are forced into the fruit 1, as shown in Figure 1. The fruit is now pared by being forcibly turned on the centers 8, and the blades 6 will thus cut under the skin of the fruit 1 and cast off the peeling through the slots 7. The flexibility of the said band 5 permits the blades 6 thereon to follow the contour line of the fruit 1 and is pressed towards the fruit 1 by the spring 12, and the guides 11 in turn hold the band 5 and the forceps in alinement with one another.

Having thus described my invention what I claim is:

1. A fruit parer of the class described, an elastic cutter holding band, multiple blades within the said elastic cutter holder band, a forceps adapted to hold the said elastic cutter holder means in alinement therewith, a spring secured between the said forceps and elastic cutter holder means, adapted to feed the said multiple blades into the skin of the fruit, as set forth.

2. A fruit parer of the class described, an elastic cutter holding band, multiple blades within the said elastic cutter holder bands, a forceps adapted to hold the said elastic cutter holder means in alinement therewith, a spring secured between the said forceps and elastic cutter holder means, adapted to feed the said multiple blades into the skin of the fruit, a spring shank, adapted to hold the said forceps in an open position, a handle positioned between the said forceps and spring shank, a manual locking means, adapted to hold the said forceps in a closed position, a radial holding means, adapted to swing fruit thereon, as set forth.

In testimony whereof I affix my signature.

FREDERICK C. PETERSEN.